United States Patent [19]
Kaufman, Jr. et al.

[11] 3,754,464
[45] Aug. 28, 1973

[54] CONTROL SYSTEM

[75] Inventors: Harold B. Kaufman, Jr.; Ernest W. Stein, both of New York; Robert F. Schiffmann, Brooklyn, all of N.Y.

[73] Assignee: DCA Food Industries, Inc., New York, N.Y.

[22] Filed: Oct. 6, 1970

[21] Appl. No.: 78,462

[52] U.S. Cl. .................................. 99/334, 99/354
[51] Int. Cl. .............................................. A23, A47j
[58] Field of Search .............. 107/14 R, 14 E, 57 R, 107/57 C, 57 D, 57 A, 58, 7 R; 17/35–40; 18/12 R, 127 M, 13 R, 14 R, 30 R, 30 CM; 25/8, 11–20; 31/8, 13, 14; 72/253–255, 261; 99/404, 352, 334, 353, 354

[56] References Cited
UNITED STATES PATENTS

| | | | |
|---|---|---|---|
| 2,926,597 | 3/1960 | Porambo | 99/353 |
| 3,111,913 | 11/1963 | Mladek et al. | 99/353 |
| 2,055,639 | 9/1936 | Scheibel | 99/352 X |
| 3,034,455 | 5/1962 | Roth et al. | 99/354 X |
| 3,154,187 | 10/1964 | Roth | 99/404 X |
| 3,115,084 | 12/1963 | Anetsberger et al. | 99/352 |
| 3,561,373 | 2/1971 | Sierert | 107/57 D |
| 3,603,269 | 7/1971 | Royer | 107/57 A |
| 3,152,560 | 10/1964 | Fries | 107/14 E |
| 2,709,955 | 6/1955 | Hunter | 99/404 |
| 3,294,037 | 12/1966 | Hoag et al. | 107/57 A X |
| 3,362,519 | 1/1969 | Skarin | 107/57 A X |

Primary Examiner—Geo. V. Larkin
Attorney—Amster & Rothstein

[57] ABSTRACT

A system for synchronizing the transfer of products between sequential processing equipment. Food products, such as dough pieces consisting of yeast raised dough and requiring "proofing," are introduced at an input end of a microwave proofer, and are initially transported at a "loading speed." When a first product row reaches the end of the proofer belt, and the products are ready to be transferred to a subsequent food processor such as a fryer, which may move the products at a different and independently controlled speed, the proofer transport is temporarily halted. The production cycle then commences. During the production cycle, the system provides intermittent start-stop operation of the proofer transport mechanism, advancing the proofer conveyor (at a higher "discharge speed") each time that the fryer conveyor belt advances into the next dough piece receiving position, and stopping the proofer conveyor in response to the readiness for transfer of each subsequent row of product into the continuously moving pockets of the fryer conveyor. Additional rows of raw product pieces are periodically deposited at the proofer's input end each subsequent time that the proofer conveyor is halted. Timing and processing controls for the transport equipment and for related sub-systems are included to insure synchronized product transfer, to accurately control proofing and transport periods and to provide regulation or proofing interval independently of the processing interval or speed of the subsequent frying equipment.

14 Claims, 2 Drawing Figures

FIG. 2.

CONTROL SYSTEM

This invention relates to industrial process controls and in general, to a system for synchronizing the transfer of processed products between processors which may have different speeds and time references. As applied to food processing, the invention relates to a system for providing integrated control of conveyor belt movement and a variety of related environmental processing parameters.

There have been a number of relatively recent advances in the commercial food processing industry which have markedly enhanced the speed of production and quality of food products. In particular, the application of new techniques in cooking technology to industrial food product preparation has permitted much higher cooking speeds than were ever possible heretofore. Such advances, while accelerating the food processing steps themselves, have also resulted in serious problems relating to the automated transfer of food products from one relatively rapid cooking step performed on a first processor to another such step to be performed, for example, by a succeeding piece of equipment which receives the cooked product from the preceding processor. This problem has also manifested itself quite generally throughout a number of industries where in-line pieces of apparatus each have related but independent time bases requiring precise correlation therebetween.

One specific area in which the advantages of this invention will become apparent is the assembly line type of operation generally utilized in the preparation of baked goods, such as doughnuts. In order to produce a commercially acceptable doughnut, a number of processing steps are required, including principally "proofing" to promote the rising of the yeast, and frying the proofed dough piece. These major steps are achieved by depositing pieces of raw doughnut pieces or "cuts" of batter in the general but amorphous shape of a doughnut, at the input to a proofer, applying external energy to the proofer and finally frying the doughnut on both top and bottom. These steps are preferably accomplished sequentially, with the gradually processed doughnut being transferred as rapidly and as efficiently as possible from one processing unit to the next. Originally, the depositing, proofing and frying steps all were controlled by hand, with manual transfer between units. Then, the concept of assembly line conveyor belt operation in travelling tray-type proofers and in fryers was developed.

However, in the past, the proofing step has required a relatively long exposure time in the proofer and accordingly, a correspondingly long proofer conveyor belt was utilized. Because of this relatively long proofing time and the corresponding commercial need for high production quantities, multiple level conveyors of relatively long length were required in the proofers to achieve the desired commercial goal. Moreover, production errors required a correspondingly long period of time before they could be detected and corrected.

With the advent of microwave cooking technology (e.g., see the copending applications Ser. Nos. 51,458, now U.S. Pat. No. 3,630,755 and 51,545, now U.S. Pat. No. 3,699,899, both filed July 1, 1970 and assigned to the assignee of the present application), the proofing speed was significantly increased. The time interval during which a food product such as a dough piece being processed into a doughnut was required to be in the proofer was thus reduced and this correspondingly eliminated the need for multi-tiered conveyors as well as the need for relatively long conveyor systems or the travelling trays employed by such systems. But attendant on these improvements, it became of importance to control not only the product proofing time, but to provide a new method for carefully synchronized regulation over the transfer of dough pieces from one moving conveyor processor to another, for example, from a microwave proofer to a deep fat pocketed belt fryer. The proofer conveyor speed could not be allowed to overload the succeeding fryer input, and yet it was desired to produce as many fried doughnuts as was feasible to thus utilize the complete speed and production capability of the microwave proofer. A related problem was to integrate and synchronize the loading of raw dough pieces into the proofer with the transfer of proofed dough pieces into the fryer, so as to have the proofer continuously loaded and yet to limit the loading in direct response to dough piece removal therefrom.

Commercially feasible microwave processing apparatus is a relatively recent development and the prior art has not really had a substantial opportunity to consider the foregoing problems. Nevertheless, to the extent that these problems have been considered, the solutions offered have not proved at all adequate. One approach to solve the main problem of proofer-fryer synchronization was to mechanically link the proofer and fryer drive mechanisms. This arrangement would, for example, slow down the proofer conveyor when the fryer conveyor speed was reduced to accommodate a different type of product which may have needed a longer frying time. One specific technique included belt drives with a drive synchronization system. This was also unsatisfactory because of its inherent complexity and because of other related mechanical problems including belt slippage.

It is therefore an object of this invention to obviate one or more of the aforesaid difficulties.

It is also an object of this invention to fully synchronize and control the transfer of food products from a first moving belt processor to a second such processor.

It is a further object of this invention to provide a control system to dependably regulate conveyor movement in an industrial food processing system in which products are periodically loaded into one moving belt processor and then deposited into a subsequent processor.

It is another object of this invention to provide for the depositing of food products at the input of a processor in response to the removal of the products from the processor's output end.

It is yet another object of this invention to regulate the residence time of food products in one processor independently of the residence times required to process the same food products in aligned equipment These and other objects and features of this invention will become apparent in one particular illustrative embodiment of the invention in which a portion of an industrial food processing assembly line is disclosed. The specific embodiment to be discussed herein and in connection with the detailed description below relates to the depositing, "proofing38 and frying of commercially manufactured doughnuts, but it will be appreciated by those skilled in the art that the invention is applicable to controlling conveyor and other equipment speeds in aligned processors accomplishing a wide variety of other functions as well.

The disclosure herein relates to a microwave proofer such as that described in copending applications Ser. Nos. 51,458 and 51,545, both filed July 1, 1970, and assigned to the assignee of the present application. As described in those applications, such a microwave proofer is designed to supplant the much slower proofing boxes or chambers of te prior art; the new proofers utilize microwave energy to rapidly promote raising the dough in the dough pieces introduced at one end of the proofer, and to thereby substantially accelerate the proofing process. One illustrative product which can be processed by the microwave proofer, and to which the present description will refer for explanatory purposes, is a doughnut — the pieces or "cuts" of raw dough are deposited in successive aligned rows on the conveyor belt at an outer projecting input end. Such depositing may be achieved either manually or automatically where the dough pieces have been prepared in quantity in a separate "makeup" system which can have its own conveyor, or they may be deposited automatically, also in rows, from a conventional doughnut pressure cutter or extruder. As will be seen hereinafter, the automatic operation of the cutter can be integrated with the control system to be synchronously responsive to the transfer of the proofed dough pieces from the output end of the proofer to an adjacent fryer.

The doughnut fryer with which the invention disclosed herein can be utilized is generally conventional, and includes a series of coupled moving conveyor belts with each belt having spaced pockets adaped to accept dough pieces from the microwave proofer. An example of this type of automatic and continuously moving doughnut fryer is shown in U.S. Pat. No. 2,709,955, issued June 7, 1955. In the operation of such a fryer, the pockets of the belt are in continuous motion at a speed which is preset in accordance with the necessary frying exposure of the particular size doughnut involved. The fryer operates by accepting aligned rows of proofed dough pieces from the proofer in its belt pockets and transporting the doughnuts, floating in the pockets, along the surface of a deep fat bath which fries the lower half of the doughnut. At the terminus of a first fryer belt run, the doughnuts are inverted and the other half of the doughnut is fried in the bath. Following complete frying, the doughnut is removed, and suitable finishing steps such as cooling, sugaring, jellying or the like may be taken with respect to those doughnuts.

To integrate and synchronize the different processing equipment, the operation of the control system of the invention provides for two basic intervals of operation, namely a first "start-up" interval when initial successive rows of raw dough cuts are being deposited on the proofer conveyor (e.g., from an automatic doughnut cutter), but before any fully proofed dough pieces have been transferred from the proofer into the fryer; during this cycle, the depositing of raw dough pieces continues as long as the fryer conveyor belt is in motion. A second interval, designated the "production" cycle, begins when product transfer from the proofer output conveyor to the fryer belt pockets commences. During the production cycle, precise correlated control is required of the movement of the fryer belt and of the related transfer of proofed dough pieces into the fryer from the proofer; the depositing of dough pieces during production is controlled directly by the detection of products being ready for transfer into the fryer. This detection during the production cycle is achieved by positioning a photoelectric cell at the furthest extremity of the proofer output conveyor, so that the sensing of proofed dough pieces about to be discharged from the proofer into the frying kettle can be utilized to initiate a number of responsive actions relating to the proofer conveyor and the associated sub-systems.

In actual practice, during start-up, an operator powers up the system to energize a number of related sub-systems of the proofer, such as a humidifier controlling environmental conditions (see copending application Ser. No. 54,157, now U.S. Pat. No. 3,670,132 filed July 13, 1970, and assigned to the assignee of the present application), the microwave power pack for the proofer, the doughnut cutter (assuming dough pieces are to be deposited automatically from such an extruder) and the fryer itself. With the application of power at start-up, all units and sub-systems are energized and the proofer conveyor belt is arranged to receive automatically deposited raw dough cuts and to transport them into and through the cavity chamber at a first and lower "proofer loading speed." In the absence of any detection by the photoelectric cell positioned near the output of the proofer conveyor, the conveyor motor operates continuously at the predetermined low speed set by the operator, with the only other control apparatus involved at this time being the automatic doughnut cutter or extruder which deposits a new row of raw dough cuts on the conveyor belt each time that the fryer conveyor belt advances one pocket length. The dough pieces are gradually proofed under the influence of the microwave energy in the proofer and proceed along the moving conveyor to an auxiliary take-away conveyor belt utilized to transfer the proofed dough pieces into the fryer.

When the first row of proofed dough pieces is detected as ready to be transferred from the take-away conveyor into the fryer, the photocell at that location on the take-away conveyor energizes a control relay and a start-stop operation of the proofer conveyor system commences the "production" cycle to achieve continuous transfer of proofed dough pieces into the fryer. The operation of a series of relays, to be described below in connection with the detailed description, halts the conveyor motor by applying a braking action thereto, and then switches the motor speed from the lower proofer loading speed to a higher "proofer discharge speed." This higher speed is desirable because it establishes a proper trajectory for the proofed doughnuts in their transfer from the proofer take-away conveyor belt into the fryer belt pockets. During this production cycle, the doughnut cutter again automatically deposits raw dough cuts on the proofer conveyor, but its automatic deposit is responsive not to the fryer belt movement as it was during start-up, but to the operation of the photocell detecting readinees for product transfer from the proofer take-away conveyor into the fryer. This insures that the proofer conveyor will always be supplied with sufficient dough cuts for continuous proofing and yet excessive loading of the proofer (which might occur if the product transfer rate into the fryer were ignored) will be avoided. With the detection of each row of proofed doughnuts ready to be transferred into the fryer, the proofer conveyor motor switches from a "Clutch" mode into a "Brake" mode and the conveyor thus temporarily stops. During each such brief halt (after the initial one during which the depositing step is inhibited), the doughnut cutter deposits its raw dough cuts onto the stopped conveyor belt, following which the advance of the fryer belt is effective to cause the proofer conveyor belt to commence movement again at the higher discharge speed.

Accordingly, when dough pieces are being transferred from the proofer into the fryer, the control system of the invention provides an intermittent start and stop operation depending upon the detection of dough pieces ready to be transferred. Following the transfer of the last row of proofed dough pieces of a particular run into the fryer, the proofer conveyor continues to operate at the higher discharge speed for an additional predetermined "grace period." Following this interval, the system switches the motor back to its lower loading speed, preparatory to either turning off the control system or to commencing start-up in connection with a subsequent run of deposited dough cuts.

The versatility of the system of this invention therefore includes the ability to control the introduction of automatically deposited extruded dough cuts during the start-up cycle in response to the advancement and positioning of the fryer conveyor belt, the speed of which is controlled by the predetermined frying time for a particular product. During the production cycle, product transfer synchronization is obtained by having the conveyor move at its relatively higher speed in response to the fryer conveyor belt advancement and positioning, while the conveyor is halted in response to the detection of product rows about to be transferred from the proofer take-away conveyor into the fryer. This halt permits the fryer conveyor to correctly position its pockets to receive proofed dough pieces, and allows sufficient time for the depositing of a new row of dough pieces at the input to the proofer.

It is therefore a feature of an embodiment of this invention that the introduction of a product to the moving conveyor of a first processor is synchronized with the production rate of a subsequent conveyorized processor.

It is also a feature of an embodiment of this invention to detect the readiness for transfer of food products from one conveyorized processor to another to thereby regulate the loading and the conveyor speed mode of the first processor.

It is another feature of an embodiment of this invention to alternately start the movement of the conveyor belt of a first processor in response to the movement of the conveyor belt of a succeeding processor, and to stop the first belt's movement in response to the detection of products ready to be transferred between processors.

It is yet another feature of an embodiment of this invention to automatically operate the conveyor of a food processor in multiple modes with varying speeds.

It is a further feature of an embodiment of this invention that during a loading cycle, the introduction of food products to be processed is synchronized with the movement of a succeeding processor conveyor, and that during a production cycle, product introduction is synchronized with the readiness for transfer of processed products to the subsequent processing equipment.

Figure 1:
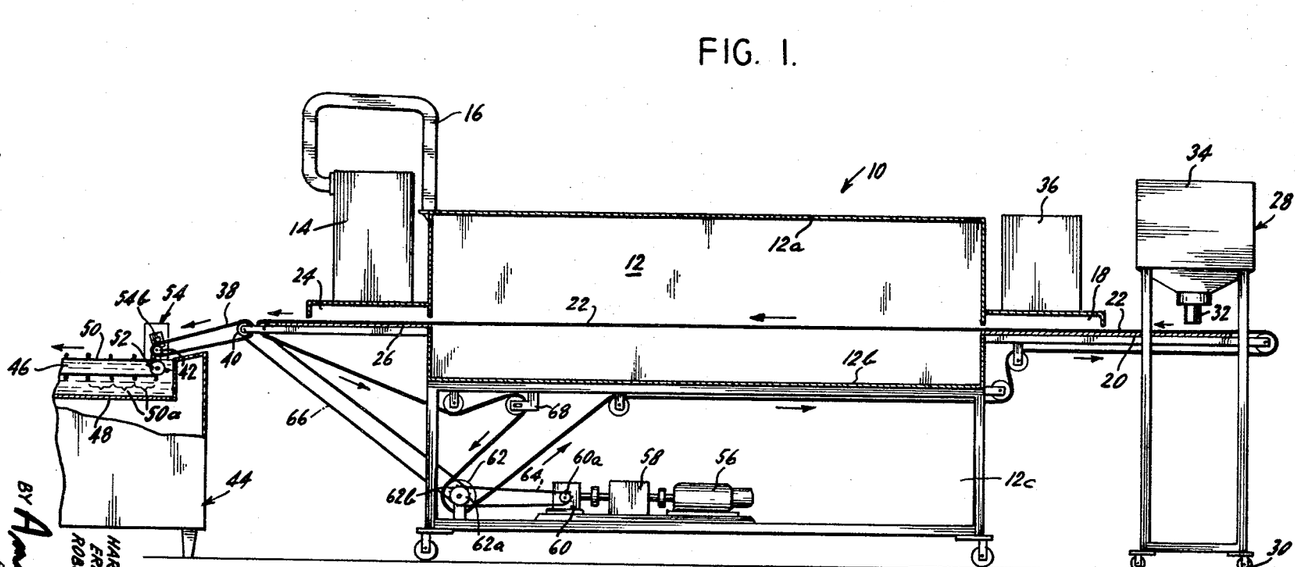
FIG. 1 is a side elevation view of a conveyor system in accordance with this invention showing a fragmentary portion of an adjacent processor.

The above brief description, as well as further objects, features and advantages of the present invention, will be more fully appreciated by reference to the following detailed description of a presently preferred, but nonetheless illustrative embodiment demonstrating objects and features of the invention, when taken in conjunction with the accompanying drawing, wherein:

THE CONVEYOR SYSTEM — FIG. 1

A. General Description

Referring initially to the illustration of FIG. 1, a conveyor system 10 is disclosed including a microwave proofer 12 with upper and lower cavity walls 12a and 12b respectively. The proofer 12 is powered by a microwave power pack assembly 14 which transfers its microwave energy into the proofer 12 by means of conduit 16. At the input end of the proofer is located an infeed end-trap 18 designed to prevent the escape of microwave energy from the proofer into the adjacent work areas — in this regard, reference may be had to copending application Ser. No. 51,531, filed July 1, 1970, now U.S. Pat. No. 3,665,141 and assigned to the assignee of the present application, for a discussion of end-trap structures. Also located at the input end of the proofer is a projecting slide bed 20 which main conveyor belt 22 moves in the direction indicated by the various arrows in FIG. 1. Corresponding outfeed end-trap 24 and outfeed slide bed 26 are included at the output end of the proofer.

This invention can be used in connection with an automatic doughnut extruder well known in the art (e.g., see U.S. Pat. No. 3,152,560, issued Oct. 30, 1964) and which is illustrated in FIG. 1 positioned over conveyor belt 22 at the input end and is identified by reference character 28. Illustratively the extruder or cutter 28 can be movable, such as on casters 30, and includes an extruding head 32 designed to deposit raw dough cuts from doughnut batter located in chamber 34 onto conveyor 22 during various portions of the proofing cycle to be described below. Finally, the input end includes an illustrative showing of a control console 36 which includes the various switches and controls necessary for both manual and automatic operation of the control system of the invention. Part of the output assembly of microwave proofer 12 is auxiliary take-away conveyor belt 38 which is mounted on separate drive sprocket wheel 40 and which is pivoted about the axis of wheel 40 to permit belt 38 to be accurately positioned with respect to the input end of fryer 44. Conveyor belt 38 transfers proofed dough pieces, which have been conveyed to it on belt 22 from outfeed end-trap 24, into fryer 44.

Only a fragmented showing of fryer 44 has been given, including the frying fat 46 contained within kettle portion 48 (for a more detailed showing of a fryer usable in conjunction with this invention, reference may be had to U.S. Pat. No. 2,709,955, issued June 7, 1955 and assigned to the assignee of the present application). Riding on the surface of fat 46 is fryer conveyor 40 having a series of adjacent pockets 50a designed to receive aligned rows of proofed dough pieces from take-away conveyor 38 (see partial plan view of belt 38 and dough piece rows 38a and 38b in FIG. 2). Because of its proximity to the fat bath 46, which ould cause it to encounter high temperatures and splashing from the fat for short periods of time, auxiliary take-away conveyor belt 38 is generally constructed of metal (e.g., wire mesh), rather than cloth which may be used for main conveyor belt 22. Transfer of proofed doughnut products from conveyor belt 38 into pockets 50a of fryer conveyor 50 is controlled by the positioning of discharge sprocket 42 which in turn is positioned in response to the lateral pivoting (not shown in FIG. 1) of auxiliary drive sprocket 40 as mentioned above — thus, by positioning drive sprocket 40, the height and orientation of discharge sprocket 42 with respect to the fryer 44 can be appropriately adjusted.

The location at discharge sprocket 42 where transfer of proofed dough pieces into fryer 44 takes place, is an important control point for two different operations controlled by the system of this invention. Discharge sprocket wheel 42 is illustratively located immediately above a drive sprocket and switching assembly 52 around which fryer conveyor belt 50 passes. In the preferred embodiment, assembly 52 acts as a conventional sprocketed drive wheel for belt 50. Additionally, however, it also includes a cam 52a concentrically mounted on shaft 52b, and a micro-switch 52c, illustrated in greater detail in FIG. 2. Switch 52c is designed to be activated by the peripheral projection 52a' on cam wheel 52a upon each rotation of drive sprocket assembly 52 which corresponds to the linear advancement of the fryer conveyor belt 50 through he length of one pocket 50a. Thus, for each 360° of rotation of wheel 52a, switch 52c will be operated, giving an indication that the next empty fryer belt pocket 50a is in a position to receive transferred proofed dough pieces from proofer 12. This switching action will be relied on in this system during the loading or "start-up" cycle to energize the automatic doughnut cutter 28 once for each advancement of a pocket length 50a of fryer conveyor 50. During the subsequent "production" cycle when products are actually being transferred into fryer 44, the advancement of each pocket length 50a will activate switch 52c to restart the movement of main proofer conveyor belt 22 after a brief stoppage in response to the system's sensing readiness for product transfer; this also permits the next pocket 50a to emerge from under discharge wheel 42, establishing a clear trajectory path for dough pieces to drop into the pockets. Thus, when switch 52c is activated during production, proofer conveyor belt 22 will then be advanced at the higher discharge speed, causing proofed doughnuts to be transferred from the end of conveyor belt 38 into the pockets 50a which have just cleared discharge wheel 42.

During the production cycle, the halting of travel of proofer conveyor belt 22 will be controlled by the action of photoelectric assembly 54 located immediately above discharge sprocket 42 and includes controls for a light source 54a and a photoelectric cell 54b — a detecting light beam (identified as 54c in FIG. 2) is thereby established across the path of travel of the rows of proofed dough pieces on conveyor belt 38. The photoelectric light beam is broken by the advancement of each row of dough pieces to the end of take-away conveyor belt 38 when the row is ready to be transferred into pockets 50a.

During start-up, when dough pieces are initially being introduced into the proofer 12, photoelectric control assembly 54 is powered, but does not cause any responsive operations since its photoelectric beam is not being interrupted. However, during actual production and product transfer into fryer 44, the interruption of the light beam from source 54a by a row 38a of dough pieces ready to be transferred causes the proofer conveyor belt 22 to halt by braking its motor. In addition, other responsive relay actions occur, including switching the motor to its higher discharge speed and simultaneously preventing the first light beam interruption from activating the doughnut cutter — this precaution is taken to avoid improper depositing of a row of raw dough cuts from cutter 28 over an existing row of cuts just previously deposited on belt 22 as the system changes over from the start-up to the production cycle. Thereafter, the automatic doughnut cutter will be activated in response to each subsequent interruption of the photoelectric light beam. Accordingly, during production, movement of principal proofer conveyor belt 22 is initiated in response to advancement of the pockets 50a of fryer conveyor belt 50, and the movement of that conveyor belt 22 is stopped each time a product row is ready to be transferred from auxiliary take-away conveyor belt 38 into a fryer pocket 50a, thus interrupting the photoelectric light beam of assembly 54.

The drive system for conveyor belt 22 and also for auxiliary conveyor 38 is contained in underlying space 12c. Variable speed motor 56 is directly coupled to a brake-clutch drive unit 58 which in turn is coupled to gear reducing apparatus 60. Main drive drum 62 drives belt 22 in response to the counterclockwise rotation of chain 64, which is driven from gear reducer sprocket wheel 60a by concentric sprocket wheel 62a. Auxiliary take-away conveyor belt 38 is also driven by this same drive system by means of drive chain 66 which receives its driving power from sprocket wheel 62b which is also concentric with drum 62 — chain 66 passes around auxiliary drive sprocket wheel 40 to drive belt 38. The sizes of sprocket wheels 62a, 40 and 62b are chosen so that the linear speeds of respectively driven belts 22 and 38 will be equal, thus permitting the advancement of rows of proofed dough pieces to proceed in continuous and smooth-running fashion from main belt 22 to auxiliary take-away belt 38 after proofing action by proofer 12.

The path of belt 22 is illustrated by the bold line in FIG. 1 and passes over a number of sprocket wheels to facilitate continuous smooth motion of the belt throughout the start-up and production cycles. In addition to the various wheels, suitable tension is maintained to take up any slack in belt 22 by means of a conventional belt take-up device 68.

B. Start-Up Cycle

After the control system powers the various drive elements, in a sequence to be described below in connection with FIG. 2, and assuming a cycle in which automatic operation of doughnut cutter 28 is involved, belt 22 commences to move in response to the action of motor 56 in the direction indicated by the arrows in FIG. 1. During the start-up cycle, the speed of motor 56 is set at a predetermined low speed for product loading purposes; this speed is maintained throughout the start-up cycle until the first row of proofed dough pieces reaches the end of conveyor belt 38 and is ready to be deposited in the fryer 44. The same drive power supplied to drive drum 62 is utilized (see partial plan view of belt 38 in FIG. 2) to drive auxiliary conveyor belt 38. Continuous advancement of successive pockets 50a of fryer conveyor belt 50 activates fryer switch 52c, causing brake-clutch drive unit 58 (controlled by brake-clutch control unit 58a) to continuously engage the clutch for motor 56 throughout the start-up cycle. Advancement of fryer conveyor belt 50 also periodically activates doughnut cutter 28, which deposits dough cuts through extruder head 32 onto conveyor belt 22 supported over infeed slide bed 20.

Continuous rows of dough pieces are thus transported on conveyor belt 22 through proofer 12 and are subjected to proofing action by the application of microwave energy from the power pack 14, with the microwave energy supplied to the proofer cavity by conduit 16. No additional actions are initiated until the first row of proofed dough pieces has traveled the path including infeed end-trap 18, proofer 12, outfeed end-trap 24 and to the terminus of auxiliary take-away conveyor 38. The first row of proofed dough pieces to reach the end of belt 38 breaks the photoelectric light beam 54c (FIG. 2) from assembly 54 and immediately brings conveyor belt 22 to a halt by the application of braking action from brake-clutch drive unit 58. The interruption of the photoelectric beam also serves to automatically switch the speed of motor 56 to its higher discharge speed, a predetermined setting on control panel 36 based upon the optimum trajectory of particular weight and size dough pieces to be transferred from auxiliary take-away conveyor belt 38 into pockets 50a—this setting can generally be made at the beginning of a given run and will remain suitable throughout that run. The start-up cycle has now been completed and the continuous production of doughnuts is ready to commence.

C. Production Cycle

The production cycle is in effect when rows of proofed dough pieces periodically break the photoelectric beam at assembly 54 and are then deposited into pockets 50a of fryer 44. (When main conveyor belt 22 starts to move again after each stoppage, it will be advanced at the higher "proofer discharge speed.") Each time fryer conveyor belt 50 advances through the length of one pocket 50a, fryer switch 52c is activated to place brake-clutch drive unit 58 in its "clutch" mode, thus energizing motor 56 to operate at the higher proofer discharge speed. The movement of conveyor belt 22 then continues until row 38a of proofed dough pieces reaches the end of auxiliary take-away conveyor 38 and is ready for transfer into pockets 50a of fryer conveyor belt 50 — this is illustrated in the partial plan view of belt 38 in FIG. 2. The photoelectric light beam 54c from light source 54 a is thus interrupted. This initiates relay action to cause brake-clutch drive unit 58 to apply braking action to motor 56 and thus halt the conveyor belt 22. At the same time that conveyor belt 22 stops, doughnut cutter 28 is activated to deposit a new row of dough cuts onto conveyor belt 22. Then, when fryer conveyor belt 50 moves forward one pocket length, the activation of fryer switch 52c again commences movement of conveyors 22 and 38 by placing unit 58 in its clutch mode, thus permitting drive motor 56 to power the drive equipment previously described.

It may therefore be appreciated that during the start-up cycle, conveyor belt 22 is operating continuously at the lower loading speed, with doughnut cutter 28 being activated periodically in response to the continuous advancement of fryer conveyor belt 50. When the production cycle commences as products are ready for transfer from take-away conveyor belt 38 into fryer 44, photoelectric assembly 54 stops conveyor belts 22 and 38, switches motor 56 into its higher proofer discharge speed and thereafter controls the operation of doughnut cutter 28 in response to subsequent interruptions of its light beam. Conveyors 22 and 38 begin to move again at the higher discharge speed when fryer conveyor belt 50 travels through the distance corresponding to the length of one pocket 50a. Conveyor belt movement continues until the next row of dough pieces interrupts the light beam from photoelectric assembly 54. Accordingly, during production, there is intermittent start-stop operation of conveyor belts 22 and 38.

Following the transfer of the last row of proofed dough pieces from conveyor belt 38 into fryer 44 in any given run, conveyor belt 22 continues to operate at the higher discharge speed for a predetermined time interval, after which the control system automatically switches motor 56 back to its lower loading speed preparatory to receiving another run of dough cuts from automatic cutter 28 or, in the alternative, to temporarily shutting down the system.

Figure 2:
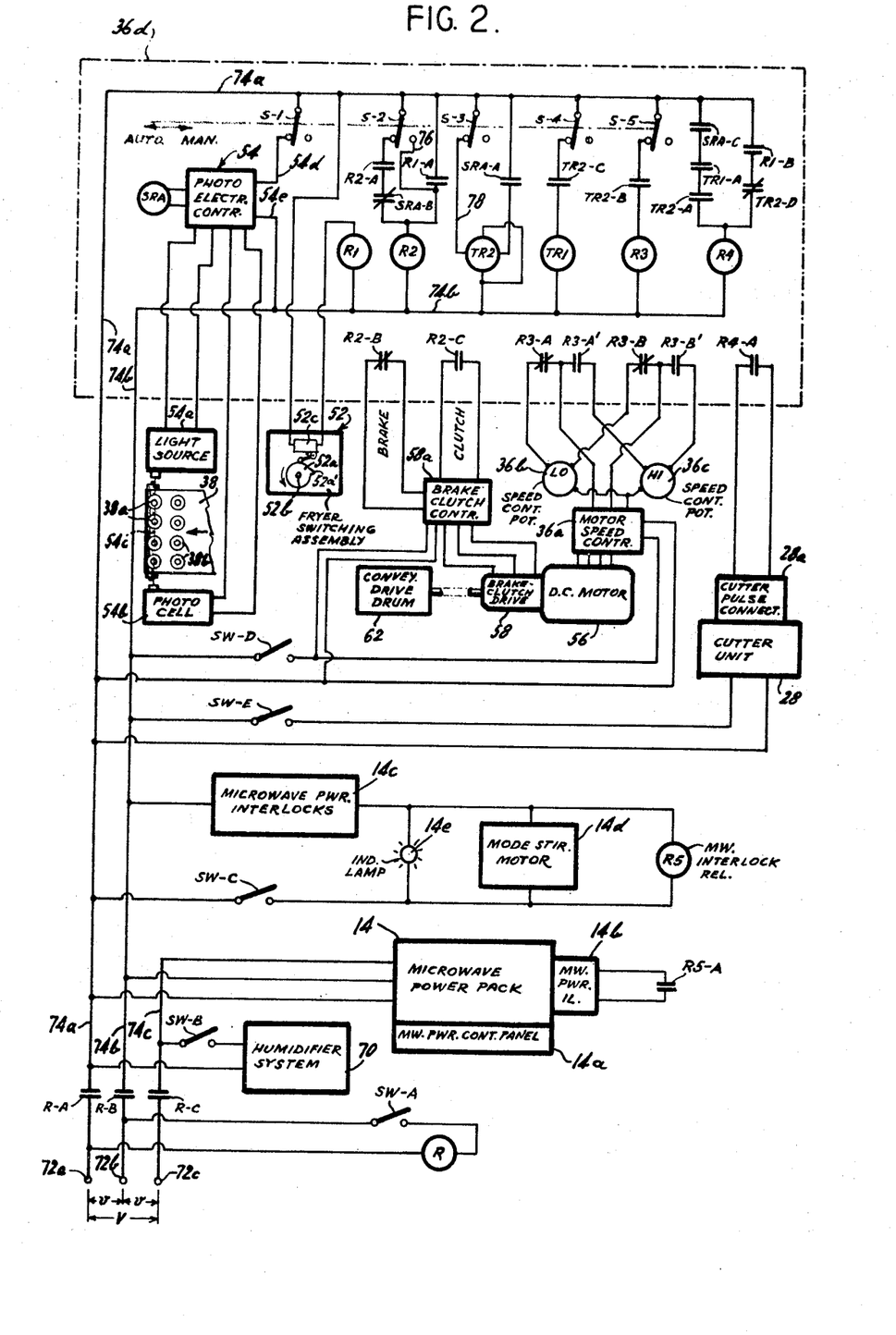
FIG. 2 is a schematic diagram of the electrical control system of the invention.

THE ELECTRONIC CONTROL SYSTEM — FIG. 2

A. General Description

1. Power and Subsystems

The electronic system of the invention is illustrated in FIG. 2, with those portions of the system of FIG. 1 which have been previously described bearing the identical reference designations. Some of the related subsystems of the conveyor control system are illustrated in block diagram form in FIG. 2, including specific portions of the structures illustrated in FIG. 1. For example, microwave power pack 14 includes an associated microwave power control panel 14a and a microwave power interlock unit 14b. The microwave system further includes separately energized microwave power interlocks 14c (e.g., connected to the doors to proofer 12) and a mode stirrer motor 14d; the energization of interlocks 14c and motor 14d is indicated by the glowing of indicator lamp 14e. A separate proofer humidifier system 70 is indicated as being energized by the closing of switch SW-B. Such a humidifier system is designed to maintain the proper temperature and related environmental conditions in the proofer 12 of FIG. 1 throughout the passage of dough pieces through the microwave cavity. The operation of such a humidifier system can be comparable to that described in copending application No. 54,157, filed July 13, 1970, and assigned to the assignee of the present application.

System power is supplied from available voltage sources across terminals 72a, 72b and 72c. As illustrated in FIG. 2, a 3-wire power system may be utilized, although a 4-wire system with an additional ground wire is equally applicable. Single phase power is appropriate and in the 3-wire system illustrated, identical voltages $v$ appear between terminals 72a and 72b and between terminals 72b and 72c. The higher voltage V, which may be needed for certain aspects of system operation, is that appearing between terminals 72a and 72c. In actual practice, the voltage designated as V can illustratively be 208 volts, whereas the voltage designated $v$ can be 115 volts. Where 3-wire power is supplied, such as to the microwave power pack 14, lead 74b will act as the neutral wire.

2. Switches

A plurality of switches is schematically illustrated in FIG. 2, each of which may conveniently take the form of push buttons located on a panel in control box 36. These switches include main power switch SW-A, which controls the application of power from leads 72a and 72b across relay R to energize the entire system; switch SW-B, which applies power from leads 74a and 74c to humidifier system 70; switch SW-C, which controls the application of power from leads 74a and 74b to microwave power interlocks 14c, mode stirrer motor 14d and microwave interlock relay R5; switch SW-D, which controls the application of power to motor speed control 36a and thus controls the selection of the speed and the actual operation of motor 56 from power available across leads 74a and 74b; and switch SW-E which supplies power from leads 74a and 74b to doughnut cutter unit 28.

The selection of the "Automatic" or "Manual" mode of operation is made by ganged switch S which includes the five switch arms S-1 through S-5 illustrated within electronic control module 36d. If switch arms S-1 through S-5 are set to their right contacts, the "Manual" mode is selected, during which continuous conveyor action obtains; no photoelectric action is possible in this mode and conveyor 22 will only operate at its low "loading speed," with doughnut cutter unit 28 being operated only in response to advancement and positioning of fryer conveyor belt 50 which periodically operates switch 52c. In some cases, it may be desirable to supplement the drive system of FIG. 1 with an auxiliary variable speed drive (not shown) which will control the movement of belt 38 during the "Manual" mode at speeds independent of the speed of main belt 22. This independent driving arrangement is controlled by an operator to synchronize the transfer of dough pieces from belt 38 into pockets 50a and may be periodically adjusted to avoid cumulative phase differences which could tend to deposit proofed dough pieces on top of the spacer bars defining pockets 50a instead of between them. The Manual mode is generally available primarily for emergency conditions to insure some minimum capability for synchronously transferring dough pieces into fryer 44 and to avoid a complete production stoppage.

If switch arms S-1 through S-5 of switch S are set to their respective left terminals as is actually illustrated in FIG. 2, the "Automatic" mode to be described below will take effect. This will provide for the energization of photoelectric control assembly 54, the sequential operation of the various relays, the start-up and production cycles of the entire system and the various speed and control operations also to be described below.

3. Relays

The relays of the system are illustrated in circular schematic form in FIG. 2 and their specific functions will now be described in general terms prior to reviewing a typical cyclical operation of the system of the invention.

a. Relay R

Relay R operates from power terminals 72a and 72b in response to the closure of switch SW-A and in operating, closes its normally open contacts R-A, R-B and R-C. This passes power from power input terminals 72a, 72b and 72c to respective power leads 74a, 74b and 74c. In this manner, microwave power pack 14 and its associated circuitry are energized over leads 74a, 74b and 74c, and power is presented to permit subsequent energization of interlock unit 14c and its associated circuitry (via switch SW-C), motor speed control 36a (via switch SW-D) and doughnut cutter 28 (via switch SW-E). Also significant is the fact that the operation of relay R makes available, by the closure of relay contacts R-A and R-B, power to electronics control module 36d over main power leads 74a and 74b. This presents energizing power to photoelectric control assembly 54 and the various other relays in electronics control module 36d.

b. Relay SRA

Photoelectric control relay SRA is powered up in response to the application of system power across leads 74a and 74b, with power being supplied to assembly 54 through switch arm S-1 and lead 54d, and from lead 54e. However, photoelectric control relay SRA only operates in response to the arrival of a row of dough pieces at the end of take-away conveyor belt 38 in readiness for transfer into the fryer belt conveyor pockets 50a, as will be described hereinafter. When relay SRA operates, its contacts SRA-A and SRA-C close momentarily, while its contact SRA-B opens momentarily. The initial responsive effect of the operation of relay SRA is due to the opening of contact SRA-B, which breaks the previously locked operating path for relay R2. Relay R2 thus releases and by virtue of the return to its normal condition of contact R2-B, brake-clutch control unit 58a causes braking action to be applied by drive unit 58. Conveyor belt 22 is thus brought to a halt. The closing of contact SRA-A completes the operating path for relay TR2 and that relay operates; finally, the first closing of contact SRA-C has no effect since at that time, contact TR1-A of time delay relay TR1 is still not closed; subsequently, when both contacts TR1-A and TR2-A have closed, each closure of contact SRA-C results in the energization of doughnut cutter relay R4.

c. Relay R1

Relay R1 is connected in series with fryer switch 52c across power leads 74a and 74b. Relay R1 thus will be energized whenever power is applied across those leads and fryer switch 52c is closed. As previously noted, fryer switch 52c closes momentarily each time fryer conveyor belt 50 advances through the length of one pocket 50a. Accordingly, relay R1 periodically closes and then opens in response to the correspondingly periodic closing and opening of fryer switch 52c. The responsive contacts of relay R1 include contact R1-A located in a series circuit with relay R2 across power leads 74a and 74b, and contact R1-b located in a series circuit with normally closed contact TR2-D and relay R4, all of which are in series across power leads 74a and 74b. The periodic operation of relay R1, thus closing its responsive contact R1-A, results in the closing of motor brake-clutch control relay R2. When fryer switch 52c closes, thus resulting in the operation of relay R1 and the closure of contact R1-A, relay R2 thus operates. The simultaneous closure of relay contact R1-B will result, only during the start-up cycle, in the periodic actuation of relay R4, thus leading to the correspondingly periodic actuation of doughnut cutter unit 28. However, during the production cycle when relay TR2 will have operated, thus opening normally closed relay contact TR2-D, the closing and opening of relay contact R1-B will be ineffective with respect to controlling the operation of relay R4.

d. Relay R2

Relay R2 controls the starting and stopping of motor 56 by respectively switching between the "Clutch" and "Brake" modes of bake-clutch control unit 58a. As previously noted, when relay R1-A operates for the first time during the start-up cycle, relay R2 operates; this closes normally open relay contact R2-C while simultaneously opening normally closed contact R2-B. The opening of normally closed contact R2-B, causes brake-clutch control unit 58a to release the braking action that had been applied by brake-clutch drive unit 58; at the same time, the closure of contact R2-C causes control unit 58a to engage the clutch of unit 58, thus passing the driving power of motor 56 to gear reducing sprocket wheel 60a. As seen in FIG. 1, the rotation of sprocket wheel 60a drives chain 64 and causes the rotation of drive drum 62, thus initiating the movement of conveyor belts 22 and 38 from sprocket wheels 62a and 62b respectively.

A separate operating path for relay R2 is also seen to exist from switch arm S-2 through the normally open contact R2-A of relay R2 itself to normally closed contact SRA-B of relay SRA. This provides a locking path for relay R2 which causes relay R2 to remain operated during start-up regardless of the periodic opening and closing of contact R1-A of relay R1. This locking of relay R2 during the start-up cycle causes brake-clutch control unit 58a to remain continuously in its "Clutch" mode as described above throughout the start-up cycle, during which time conveyor belt 22 moves continuously at its lower loading speed.

During the production cycle, when photoelectric relay SRA is periodically operating in response to the readiness for transfer of proofed dough pieces from take-away conveyor belt 38 into fryer belt pockets 50a, thus breaking the photoelectric light beam 54c from source 54a, the locking path just described for relay R2 is periodically broken by the opening of normally closed contact SRA-B. Each interruption of the locking path will cause relay R2 to release, assuming that relay R1 is no longer operated at that time — this will generally be the case at the precise moment when a row of proofed dough pieces has reached the end of belt 38 and is ready to be transferred into a waiting row of pockets 50a in fryer 44.

Thus, the condition of relays R1 and R2 just prior to the time of product transfer will be: relay R1 released (since the advancement of fryer conveyor belt 50 will have previously energized relay R1 by momentarily closing switch 52c), and relay R2 released as well because of the opening of contact SRA-B. The release of relay R2 causes normally closed contact R2-B to engage the brake circuit of brake-clutch control unit 58a as described above and braking action is applied from drive unit 58 to motor 56. When fryer conveyor belt 50 completes its advance through another pocket length, relay R1 will again operate in response to the closure of fryer switch 52c, thus closing contact R1-A and operating relay R2 to engage the "Clutch" mode via closed contact R2-C. Conveyor belt 22 will thus commence its movement again, as will belt 38, thus providing for the transfer of row 38a into waiting pockets 50a.

Finally, it is noted that during the "Manual" mode of operation, when switch arm S-2 of ganged control switch S is at its right terminal, a permanent operating path for relay R2 is provided through conductor 76, bypassing contact R1-A. Relay R2 will therefore stay operated throughout the "Manual" mode, thus maintaining clutching action from control unit 58a. Belt 22 therefore moves continuously (at its lower speed) when the "Manual" mode is selected.

e. Relay TR1

The system of the invention includes two time delay relays, namely relays TR1 and TR2. Relay TR1 is arranged to have an operating delay, whereas relay TR2 has a delayed denergization and thus holds after operating. Thus, relay TR1 operates whenever the system is powered in its Automatic mode over a series path including switch arm S-4, closed contact TR2-C (after relay TR2 operates) and the coil of relay TR1, all of which is across power bus conductors 74a and 74b. As previously noted, the time delay included in relay TR1 is effective to delay the closing of control TR1-A despite the application of power across the previously traced operating path. Relay TR1 is arranged to delay its actual operation and thus to defer closing contact TR1-A, for a time period sufficiently long so that the first activation of photoelectric relay SRA in response to the positioning of a first row 38a in a given run of dough pieces at the end of conveyor belt 38, will not be effective to energize doughnut cutter control relay R4.

Specifically, when relay TR2 operates (see below) in response to the first operation of photoelectric relay SRA, relay contacts SRA-C and TR2-A in the operating path for relay R4 will be closed. However, normally open contact TR1-A will remain open since relay TR1, although having its coil energized, will have the operation of its responsive contact delayed. Shortly thereafter, for example when photoelectric relay SRA has released and is about to have its photoelectric light beam 54c from source 54b interrupted by the second row 38b of dough pieces ready for transfer into fryer 44, relay TR1 completes its operation, thus closing contact TR1-A in accordance with the time delay setting of relay TR1. However, at this instant, photoelectric relay SRA has not yet closed for a second time, so that contact SRA-C is in its normally open condition. Thus, despite the closed condition of contacts TR1-A and TR2-A subsequent to the release of photoelectric relay SRA and prior to its second operation, doughnut cutter relay R4 does not yet operate.

As previously noted, the purpose of delaying the operation of relay R4 at the commencement of the production cycle until the second energization of photoelectric relay SRA, is to prevent doughnut cutter 28 from depositing a row of raw dough cuts on top of (or too closely spaced from) an existing row of such cuts which may be still underlying extruder head 32 on conveyor belt 22. Thus, when conveyor belt 22 was brought to a halt at the termination of start-up and the commencement of the production cycle (during which dough pieces are being discharged from proofer 12), the last row of deposited cuts (deposited in response to the closing of contact R1-B) may not have moved at all or may have moved only a relatively short distance along conveyor belt 22, especially since conveyor belt 22 was then operating at the low loading speed. It is possible the arrival of the first row 38a of dough pieces at the end of belt 38, thus causing relay SRA to operate, will occur nearly simultaneously with the previous deposit of a row of dough pieces on belt 22 in response to the closing of contact R1-B; this would result in a row of dough cuts remaining approximately under doughnut cutter 28 at the end of start-up, when belt 22 is brought to an immediate halt by the sequential operation of relay SRA and the release of relay R2. And even where conveyor belt 22 has transported the last row of start-up cycle dough pieces some distance before belt 22 stops, it is still important to avoid having the first row of dough cuts deposited on conveyor 22 during the production cycle from being too closely spaced to the last row of dough cuts deposited on the belt 33 at the end of the start-up cycle. This is achieved by having relay TR1 delay its operation, for example for 2 seconds, thus keeping contact TR1-A open and precluding relay R4 from operating at that moment. Then, during the remainder of the production cycle when relays TR1 and TR2 have both operated, contacts TR1-A and TR2-A will both remain closed, and doughnut cutter relay R4 will be activated periodically in respose to the operation of photoelectric relay SRA via the closing of contact SRA-C.

f. Relays TR2 and R3

Relay TR2 is a time delay relay which holds in its operated condition for a specific time period following energization of its relay coil. Thus, when power is applied to the system power busses 74a and 74b, relay TR2 has its operating path set up from conductor 74a, switch arm S-3, conductor 78 and to the coil of relay TR2. However, relay TR2 does not operate at this time. Only when photoelectric relay SRA operates and thus closes contact SRA-A will the energization of relay TR2 take place. At that time, signalling the beginning of the production cycle, relay TR2 operates and holds operated throughout the production cycle and only releases a predetermined time period subsequent to the end of the production cycle, for example 10 seconds thereafter. (Relay TR2 will also release at any point following a lapse of e.g., 10 seconds between arrival of product rows at the end of belt 38.)

Specifically, at the first energization of photoelectric relay SRA, relay TR2 operates and closes its normally open contacts TR2-A, TR2-B and TR2-C, and at the same time opens its normally closed contact TR2-D. The closing of contacts TR2-A, and TR2-C has already been described in connection with the operation of relays R4 and TR1 respectively. When contact TR2-B closes, it establishes an operating path for motor speed control relay R3 from bus 74a and through switch arm S-5 to the coil for relay R3. The operation of relay R3 at the commencement of the production cycle causes normally open contacts R3-A and R3-B to open, while closing normally open contacts R3-A' and R3-B'. During the start-up cycle, when contacts R3-A and R3-B were in their normally closed conditions, "low" speed control potentiometer 36b was effective to cause motor speed control unit 36a to run motor 56 at the relatively lower proofer loading speed. However, once production commences, with conveyor belt 22 periodically halting within proofer 12 such that the dough pieces would otherwise tend to be exposed to microwave energy therein for occasionally longer periods of time, the speed of conveyor belt 22 is increased to compensate for the halts, particularly since a given product should only receive a set quantity of microwave energy. In addition, the higher speed is also desirable to establish the correct trajectory for dough pieces entering fryer 44.

Accordingly, the operation of relay R3 at the commencement of the production cycle closes contacts R3-A' and R3-B', thus inserting "high" speed control potentiometer 36c into a circuit with motor speed control 36a. Motor 56 thereafter operates at the relatively higher proofer discharge speed throughout the production cycle. Motor speed control relay R3 remains operated throughout this production cycle since it is controlled by the closure of contact TR2-B and as has already been noted, relay TR2 will remain operated until a predetermined time interval following the last actuation of photoelectric relay SRA (or until such an interval has elapsed after any actuation of relay SRA).

g. Relay R4

The operation of doughnut cutter control relay R4 has already been mentioned — i.e., relay R4 operates during the start-up cycle in response to the periodic closing of contact R1-B, which occurs each time fryer switch 52c is activated as fryer conveyor belt 50 advances. During the production cycle, when relays TR1 and TR2 are in their operated conditions, relay R4 is energized by the periodic closing of contact SRA-C when rows of products are arriving at the end of belt 38 and interrupt light beam 54c. Each operation of relay R4 closes contact R4-A, thus energizing cutter pulse connector 28a to which doughnut cutter unit 28 is responsive. A new row of raw dough cuts is thereupon deposited from extruder head 32 onto temporarily stationary conveyor belt 22 at such times.

h. Relay R5

Finally, microwave interlock relay R5 is energized when the system powers up. Switch SW-A is closed to energize relay R and power is passed through closed relay contacts R-A, R-B and R-C to conductors 74a, 74b and 74c. Then, when switch SW-C is closed, the microwave power interlocks 14c provide an operating path for relay R5 if the cavity doors are closed. Contact R5-A closes and activates microwave power interlock module 14b which governs the application of microwave energy from power pack 14 into the cavity of proofer 12. The main microwave circuitry therefore remains powered throughout all cycles of the machine as long as line power is supplied to conductors 74a, 74b and 74c and the appropriate switches on 14a are turned on.

B. SYSTEM OPERATION — "AUTOMATIC MODE"

There follows a description of the operation of the electronics of the invention as illustrated in FIG. 2, during a normal start-up cycle and later a production cycle, when the "Automatic" mode is in effect — i.e., when switch S and its responsive arms S-1 through S-5 are set at their respective left terminals.

1. Start-Up Cycle

Switches SW-A, SW-B, SW-C, SW-D and SW-E can be closed in varying sequences to power the system, but a preferred sequence would involve the initial closure of switch SW-A to apply basic system power throughout the circuit of FIG. 2. Thus, the closing of switch arm SW-A applies a voltage $v$ from terminals 72a and 72b across the coil of relay R which thereupon operates. Relay contacts R-A, R-B and R-C close and supply the system with voltage along conductors 74a, 74b and 74c respectively. Before any other switches are closed, microwave power pack 14 is energized by voltage V supplied across conductors 74a and 74c, with conductor 74b acting as the neutral wire. The closure of switch SW-B energizes humidifier system 70 from conductors 74a and 74c, while the closure of switch SW-C energizes the microwave power interlock circuit including motor 14d, indicator lamp 14e and microwave interlock relay R5, when the contacts in 14c are closed. When relay R5 operates, contact R5-A closes and energizes microwave power interlock 14 b coupled to microwave power pack 14.

At this point, with power being supplied to electronics module 36d over conductors 74a and 74b, photoelectric control assembly 54 has been energized so that light source 54a is providing its light beam 54c to photocell 54b. Obviously, no interruptions have yet taken place with respect to that light beam. In addition, relay TR2 is set up for subsequent operation in response to the closing of contact SRA-A by the application of power from conductor 74a through switch arm S-3 and conductor 78. However, relay TR2 does not operate at this time.

When all other subsystems (except for cutter 28) have been powered, switch SW-D can be closed to provide power to motor 56 through motor speed control 36a; by this time, the other subsystems (including some not shown) are fully operational, and power build-up has occurred in microwave power pack 14.

Finally, switch SW-E is then closed and power is thereby provided from conductors 74a and 74b to doughnut cutter unit 28 and its associated pulse circuit 28a. However, unit 28a will not pulse cutter 28 unless and until relay R4 operates to close contact R4-A.

Once the system is fully powered, microwave power is then applied to proofer 12 by microwave power pack 14 through conduit 16 (FIG. 1). Power is being supplied to electronics control module 36d over power conductors 74a and 74b. This powering of module 36d results in activating photoelectric control assembly 54 from lead 74a over switch arm S-1 and lead 54d, and from lead 74b to lead 54e — this provides power for light source 54a and photocell 54b. In addition, at this initial stage during start-up, relay TR2 is prepared for operation by the supplying of power from conductor 74a through switch arm S-3 and to lead 78; but relay TR2 will not operate until photoelectric relay SRA operates subsequently to commence the production cycle and contact SRA-A closes momentarily. Since relay R2 has not yet operated either, the normally closed condition of contact R2-B causes brake-clutch control 58a to apply braking action to motor 56 via drive unit 58. Thus, despite the closing of switch SW-D to supply power to motor speed control 36a and motor 56, conveyor belt 22 is not yet permitted to move. Except for relay R5 which is involved in the microwave interlock circuit, no other relays are operated at this time.

The initial relay operation occurs in response to the advancement of fryer conveyor belt 50 through at least one pocket length 50a. This activates fryer switch 52c and thereby operates relay R1 which is connected in series with switch 52c across power conductors 74a and 74b. When relay R1 operates, its contacts R1-A and R1-B close, respectively resulting in the operation of relays R2 and R4 over obvious operating paths. When relay R2 operates, the closure of its contact R2-A, together with the normally closed condition of contact SRA-B, locks relay R2 in its operated condition throughout start-up, regardless of the state of relay R1 and contact R1-A. In response to the operation of relay R2, normally closed contact R2-B opens and normally open contact R2-C closes, thus disengaging the brake and engaging the clutch of brake-clutch drive unit 58. Motor 56 is thus permitted to transfer its drive power through gear reducer 60 and by means of drive chain 64 attached to sprocket wheel 62a, main drive drum 62 begins to advance main conveyor belt 22 through proofer 12. At this time, motor 56 is operating at the "low" loading speed set on speed control potentiometer 36b — this occurs since speed control relay R3 is not yet operated and normally closed contacts R3-A and R3-B are thus effective to place potentiometer 36b in circuit with motor speed control 36a.

The other effect of the operation of relay R1 occurs in response to the closing of contact R1-B. Since relay TR2 is not operated at this time, its contact TR2-D is in its normally closed condition. An operating path is therefore established for relay R4 over power conductor 74a, closed contact R1-B, normally closed contact TR2-D and the coil of relay R4 to power conductor 74b. Relay R4 thereupon operates, closing contact R4-A and causing cutter unit 28 to receive a pulse from its associated pulse circuitry 28a. A row of raw dough pieces is thereby deposited from extruder head 32 onto slowly moving conveyor belt 22; the depositing is initiated by the pulse from unit 28a and lasts for less than one second. The raw dough cuts enter a microwave region in infeed end-trap 18 and continue through the cooking process in proofer 12. The release of relay R1 after fryer switch 52c is no longer activated (subsequent to each advance of fryer conveyor belt 50), results in the opening of contact R1-B, breaking the operating path of relay R4. Accordingly, relay R4 releases and contact R4-A returns to its normally open condition. Pulse unit 28a thus terminates its control over cutter unit 28.

Throughout the start-up cycle, relay R1 continues to operate periodically in response to each separate closure of fryer switch 52c as fryer conveyor belt 50 advances. However, at this time, no doughnuts are in fryer 44 since they have not completed the proofing process. With conveyor belt 22 operating at its relatively lower loading speed sufficient to expose each row of dough pieces to adequate amounts of microwave energy when conveyor belt 22 moves continuously, the first row of proofed dough pieces eventually reaches outfeed end-trap 24 and is automatically transferred from conveyor belt 22 to take-away conveyor belt 38. Conveyor belt 38 is operating at substantially the same linear speed as conveyor belt 22 and when the first row 38a of proofed dough pieces reaches the end of that belt, the light beam 54c supplied from source 54a to photocell 54b is interrupted and this signifies the end of the start-up cycle and the commencement of the production cycle as a number of relay actions occur.

2. Production Cycle

When the first row 38a of dough pieces reaches the end of belt 38 and is about to be transferred into an empty pocket 50a in fryer 44, relay R1 will generally have completed its operation and will be released. However, relay R2 will still be holding operated because its locking contact R2-A is closed as is normally closed contact SRA-B. Thus, motor 56 will be advancing belt 22 at the lower loading speed until the first row 38a of dough pieces breaks the photoelectric light beam of assembly 54, causing photoelectric relay SRA to operate to terminate the start-up cycle and commence the production cycle.

Motor 56 is initially brought to a halt when the opening of normally closed contact SRA-B breaks the previously closed locking path which had resulted in the operation of relay R2. In response to the releasing of relay R2, contacts R2-B and R2-C return to their normally closed and open conditions respectively, thus causing brake-clutch control unit 58a to apply braking action, via drive unit 58, to motor 56. Conveyor belt 22 thus stops its movement and whatever dough cuts are in the process of being proofed in proofer 12 at that time continue to receive microwave energy while belt 22 remains stationary for a brief interval.

The closure of contact SRA-A results in the operation of relay TR2, which includes a time delay designed to hold relay TR2 operated throughout the production cycle and for an additional predetermined period thereafter — thus, relay TR2 will remain in its operated condition as long as contact SRA-A continues to close within a given time period after its previous release. For example, the time delay may illustratively be approximately 10 seconds. When photoelectric relay SRA does operate within this time interval, contact SRA-A closes to maintain relay TR2 continuously operated. In other words, relay TR2 operates after contact SRA-A closes for the first time and stays operated for a given time period, even when contact SRA-A opens. Relay TR2 exercises principal supervisory control over other components of the circuit during the production cycle.

Specifically, the closing of contact TR2-B provides a straightforward operating path for speed control relay R3; the closure of normally open contacts R3-A' and R3-B', together with the opening of normally closed contacts R3-A and R3-B, removes low speed control potentiometer 36b from the circuit, and introduces higher speed control potentiometer 36c into the circuit with motor speed control unit 36a. Potentiometer 36c is adjusted to establish the higher speeds of belt 22 and of take-away conveyor belt 38, thus establishing a particular trajectory for a proofed dough piece as it leaves conveyor belt 38 and is dropped into pocket 50a of moving fryer conveyor belt 50. This trajectory is set in accordance with the size and weight of the dough pieces being deposited by cutter unit 28, as well as in accordance with the speed of fryer belt 50. Once the setting of higher discharge speed potentiometer 36c is set, it generally can be maintained at that setting throughout a given run.

The closing of contact TR2-A when relay TR2 operates begins to establish a new operating path for relay R4. However, although photoelectric relay SRA already will have operated at this time, thus closing contact SRA-C, the closing of contact TR2-A still does not energize relay R4 to initiate automatic doughnut cutting action; this is because relay TR1, although set up for operating by the closure of contact TR2-C, has a predetermined delay before it operates, thus still maintaining contact TR1-A in its open condition for a further brief interval.

After the passage of its brief delay period (e.g., 2 seconds), relay TR1 does operate, closing contact TR1-A. With the closing of contacts TR1-A and TR2-A, relay R4 thus will have its coil energized at any time during the production cycle when photoelectric relay SRA operates and closes contact SRA-C. The effect of the delay in the operation of relay TR1 is to "mask" or block the effect of only the first closure of contact SRA-C to prevent premature actuation of relay R4 and thus of doughnut cutter unit 28. This feature precludes the depositing of a new row of dough cuts at the beginning of the production cycle either upon or too close to the last row of dough cuts deposited at the end of the start-up cycle. The final effect of the operation of relay TR2 at the beginning of the production cycle is to disable the previous start-up cycle operating path for doughnut cutter relay R4 by opening contact TR2-D. Thus, relay R4 no longer can operate in response to the closing of contact R1-B whenever fryer switch 52c closes.

The production cycle of proofed doughnuts thus continues with conveyor belt 22 transporting the dough pieces through proofer 2 at the higher discharge speed set by potentiometer 36c during the production cycle. Each time that a row of dough pieces reaches the end of take-away conveyor belt 38, photoelectric relay SRA operates to deenergize motor control relay R2 by opening contact SRA-B momentarily, thus resulting in the application of braking action from brake-clutch drive unit 58 to motor 56. Belt 22 thus stops moving. No change in condition will occur with respect to relays TR1, TR2 or R3, since they are all maintained in their operated conditions throughout the production cycle as explained above. With each operation of photoelectric relay SRA and the corresponding closing of contact SRA-C, doughnut cutter relay R4 closes its responsive contact R4-A, doughnut cutter unit 28 is pulsed by unit 28a and a row of new doughnut cuts is deposited from extruder head 32 onto temporarily stationary conveyor belt 22. Thus, as fryer conveyor belt 50 continues its regular advancement, fryer switch 52c will close when another pocket length distance (50a) has been traversed by belt 50. Relay R1 thereupon operates and the closure of its contact R1-A re-energizes motor control relay R2 which causes brake-clutch control unit 58a to engage the clutch of drive unit 58 for motor 56. Belt 22 then commences to move again at its higher speed under the influence of the setting of control potentiometer 36c.

The proofing and frying steps continue in any given run until, for example, it is decided to terminate the run when the dough in chamber 34 of doughnut cutter unit 28 is consumed or prior to that time simply by the disconnecting of cutter unit 28 (e.g., by opening switch SW-E). The control system will continue to operate, however, as long as there are dough pieces being passed through proofer 12 and from take-away conveyor belt 38 into pockets 50a of fryer 44. Operation of the system is maintained as long as transfer of dough pieces into fryer 44 occurs, thus periodically interrupting the light beam of photoelectric control assembly 54. Thus, even after cutter unit 28 is no longer depositing any raw doughnut cuts on conveyor belt 22, the operation of photoelectric relay SRA periodically deenergizes motor control relay R2 to apply braking action to motor 56 to halt conveyor belt 22, and the subsequent and also periodic operation of relay R1 in response to the closure of fryer switch 52c closes contact R1-A and energizes motor control relay R2 to apply clutching to motor 56. In addition, the continued periodic closing of contact SRA-C will energize the coil of relay R4, thus closing contact R4-A; however, since cutter unit 28 has either been disabled or removed entirely from the system at this point, no additional dough cuts are deposited on conveyor belt 22.

The intermittent movement and halting of conveyor belt 22 will continue until no more dough pieces are available for transfer into fryer pockets 50a; for a brief "grace period" thereafter, belt 22 still advances continuously at its higher speed. Thus, when the light beam from photoelectric control assembly 54 is no longer being interrupted, photoelectric relay SRA cannot operate any further to halt belt 22. Its contacts therefore remain in their normal conditions, with contacts SRA-A and SRA-C open, and contact SRA-B closed. Because of the open condition of contacts SRA-A and SRA-C, relays TR2 and R4 respectively cannot operate as they did during the production cycle. The de-energization of relay TR2, after the passage of the predetermined grace period (e.g., approximately 10 seconds), de-energizes relays TR1 and R3. Positive disabling action is thus applied with respect to the production cycle operating path of relay R4 by the open of contacts TR2-A and TR1-A after the grace period has passed. In addition, the opening of contact TR2-B causes relay R3 to release and the return of the contacts of relay R3 to their normal conditions disconnects high speed control potentiometer 36c from motor speed control unit 36a, and reintroduces the control of speed control potentiometer 36b. Accordingly, when motor 56 starts up again as will be explained below, belt 22 will move at the relatively lower proofer loading speed in preparation for the next run or for shutdown.

Contact SRA-B of photoelectric relay SRA will stay in its normally closed condition since no more light interruptions are occurring at assembly 54. Motor control relay R2 will remain locked in its operated condition based upon the most recent or next succeeding operation of relay R1, closing contact R1-A. Since contact SRA-B will thereafter remain continuously in its normally closed state, relay R2 will be locked operated by the closure of contact R2-A; once relay R2 locks operated, the condition of contact R1-A has no influence on relay R2. Accordingly, even if fryer 44 continues to operate (as it generally will to complete the frying for the end of the run of doughnuts), thus periodically closing fryer switch 52c and leading to the periodic operating of relay R1, contacts R1-A and R1-B will have no effect on the system, the former because relay R2 is already locked in its operated condition, and the latter because relay R4 is ineffective to control doughnut cutter unit 28 which has either no more doughnut batter to deposit or else has been diasbled or disconnected from the system.

In summary, therefore, all power systems are still operative, but relays TR1, TR2, R3 and R4 are either inoperative or ineffective to control any responsive equipment. Relay R1 still continues to operate periodically in response to each closure of fryer switch 52c and relay R2 maintains constant clutching control over motor 56 from unit 58 throughout this intermediate sequence. If fryer 44 at any time concludes its operation and its conveyor belt 50 is temporarily halted, there will be no more closures of fryer switch 52c and relay R1 will no longer operate. However, motor control relay R2 will still be locked in its operated condition for so long as power is applied across conductors 74a and 74b and switch S is maintained in its "Automatic" mode.

At this time, therefore, the operated condition of relay R2 causes motor 56 to advance conveyor belt 22 at the lower loading speed set by potentiometer 36b. While no other system components within electronics module 36d are operative at this time, the system is nevertheless prepared for the commencement of any new run of doughnuts. All that is required is that doughnut cutter unit 28 be returned to the system with a suitable load of doughnut batter contained in chamber 34. Thereafter, once the accompanying fryer unit 44 is started up again with its belt 50 advancing, fryer switch 52c and thus relay R1 will begin to operate as described above at the beginning of the start-up cycle. Operation of the system will then be as has been previously described.

3. System Operation Without Automatic Doughnut Cutter Unit

As has been briefly alluded to above, one specific and preferred form of operation of the invention utilizes an automatic doughnut cutting unit 28. When such a unit is in the system, it operates to deposit raw dough cuts on conveyor belt 22 during the start-up cycle in response to the advancement of fryer conveyor belt 50 which controls the operation of relay R1, periodically closing contact R1-B and thus energizing relay R4. The closing of responsive contact R4-A causes pulse unit 28a to energize cutter unit 28 and a row of raw dough cuts is deposited through extruder head 32 onto conveyor belt 22. A similar depositing of raw dough cuts also occurs during the production cycle, although at that time it is in response to the periodic operation of photoelectric relay SRA and the responsive closing of contact SRA-C.

It is also possible to operate the system without an automatic doughnut cutter unit 28. In some cases, it may be desirable to utilize a separate dough piece makeup conveyor system (not shown) which independently prepares multiple rows of raw dough pieces for example, from sheets of suitable dough which are cut by conventional doughnut dies. Such makeup conveyor systems are well known in the art and could be applied to result in the supplying of spaced rows of raw dough cuts which are ready to be introduced into the microwave proofer 12.

However, when the depositing of the raw dough cuts onto conveyor belt 22 is not being automatically controlled by a unit such as 28, which is directly responsive to either the advancement rate of fryer conveyor belt 50 (during start-up) or to the readiness for transfer of proofed dough pieces from take-away conveyor belt 38 into fryer 44 as detected by photoelectric assembly 54 (during production), spacing of the deposited dough piece rows can be accomplished by controlling the rate at which the makeup system cuts out the dough. Using this technique, during the start-up cycle when conveyor belt 22 is moving continuously at the lower proofer loading speed as set by speed control potentiometer 36b, the successive dough piece rows placed onto conveyor belt 22 at the input end thereof should be spaced in accordance with the production rate of fryer 44.

When the production cycle commences and conveyor belt 22 begins to move at the higher proofer discharge speed set by speed control potentiometer 36c, the rows of dough pieces are deposited from the makeup system onto belt 22 when belt 22 is halted. The intermittent start and stop operation explained above when automatic doughnut cutter unit 28 is in the system is the same when dough pieces are being deposited on belt 22 from a makeup system — however, it is important that raw dough pieces be deposited on belt 22 in synchronism with the intermittent stoppages of belt 22 during the production cycle. The adjustment of the spacing of dough piece rows may be accomplished either automatically in the case of an automatic makeup conveyor system, or it may be done with manual supervision based upon the speed at which belt 22 is moving and in accordance with the intermittent stoppages of that belt during the production cycle.

C. SYSTEM OPERATION — "MANUAL" MODE

The foregoing description relates to the operation of the system of the invention when switch S is set in its "Automatic" mode, with its switch arms S-1 through S-5 at their respective left switch terminals in FIG. 2. However, and generally in emergency situations, it may be necessary to operate the system of the invention in the "Manual" mode with switch arms S-1 through S-5 at their right terminals. This would generally be done where some relay or other electrical component of the system has been improperly disabled, or has in any way failed or is not properly operating — in order to permit such unit to be traced down and yet to continue some limited production during such repair interval, the Manual mode is also included in the system.

The start-up cycle in the Manual mode is identical to that described above with respect to the Automatic mode. That is, the initiating switches SW-A, SW-B, SW-C, SW-D and SW-E are all closed to provide power to the system of the proofer, as well as to the related subsystems already noted. However, the positioning of each of switch arms S-1 through S-5 at their respective right terminals can be seen, from FIG. 2, to exclude the following components from the circuit: photoelectric control assembly 54 and its associated photoelectric relay SRA (controlled by switch arm S-1), relay TR2 (controlled by switch arm S-3 and contact SRA-A), relay TR1 (controlled by switch arm S-4 and contact TR2-C) and relay R3 (controlled by switch arm S-5 and contact TR2-B). Moreover, although relay R2 cannot operate during this Manual mode over the path including switch arm S-2, contact R2-A and contact SRA-B, it can operate over the direct path from switch arm S-2 to its right terminal and to conductor 76.

Relay R1 can also still operate, since power has been supplied to busses 74a and 74b; whenever fryer switch 52c operates in response to the advancement of fryer belt 50, relay R1 will operate and close its contacts R1-A and R1-B. The closing of contact R1-A will have no effect during the Manual mode because it is bypassed by conductor 76; but the closing of contact R1-B will still cause cutter control relay R4 to operate.

Accordingly, when power is initially supplied to the electronics control module 36d when the Manual mode is in effect, relay R2 operates, opening contact R2-B and closing contact R2-C. The closed state of contact R2-C causes brake-clutch control unit 58a to apply clutching action from drive unit 58 to motor 56, and conveyor belts 22 and 38 begin to advance. Conveyor belt 22 moves at the lower proofer loading speed under the influence of speed control potentiometer 36b, since relay R3 remains unoperated throughout the Manual mode of operation — its closed contacts R3-A and R3-B place potentiometer 36b in the circuit to the exclusion of potentiometer 36c. It is noted that since relay R2 cannot operate in the Manual mode, motor 56 can only advance belt 22 at the lower proofer loading speed during the Manual mode.

The first operation of relay R1, in response to the first closing of fryer switch 52c as belt 50 advances, closes its responsive contact R1-B. Since relay TR2 also cannot operate in Manual mode, contact TR2-D will remain in its normally closed condition throughout that mode and accordingly, the closure of contact R1-B provides an operating path for doughnut cutter relay R4. This closes contact R4-A and results in the depositing of a new row of raw dough cuts on conveyor belt 22 from doughnut cutter unit 28 in response to each closure of fryer switch 52c.

As fryer conveyor belt 50 continues its advancing movement, fryer switch 52c will be disengaged as cam 52c rotates, and the circuit over which relay R1 had previously operated will be broken. The release of relay R1 causes contacts R1-A and R1-B to open. The former has no effect (since relay R2 remains operated over the direct path to lead 76), but the latter causes relay R4 to release, positively terminating any activation of automatic doughnut cutter unit 28. The periodic operation and release of relay R1 will continue throughout this Manual mode in response to the closures and openings of fryer switch 52c; each operation of relay R1 results in the depositing of a row of dough cuts on belt 22 while the release of relay R1 terminates the depositing steps. Belt 22 advances continuously as long as switch arm S-2 is at its right terminal and the system is powered up. Each closing of contact R1-B to thereby operate relay R4 results in the depositing of rows of raw dough pieces from cutter unit 28 onto conveyor belt 22. At that time, belt 22 is moving at the lower loading speed set on potentiometer 36b since brake-clutch control unit 58a is activated, by the closed condition of contact R2-C, to energize the clutch of drive unit 58.

It will therefore be appreciated that throughout the Manual mode of operation, conveyor belt 22 moves continuously and receives deposited dough pieces from cutter unit 28 while the belt is in motion; however, since belt 22 is moving only at the lower loading speed, this is a permissible variation for the Manual mode of operation.

Moreover, it may well be that during this Manual mode, which is instituted primarily under emergency conditions, automatic doughnut cutter unit 28 may not be required (although it still can be utilized). If cutter 28 is not used, the closing of contact R1-B to operate relay R4 will be ineffective insofar as resulting in the depositing of raw dough cuts onto conveyor belt 22. Rather, such depositing of dough cuts may, under these circumstances, be achieved by a makeup conveyor system, either automatically or manually, as described above. When such a makeup system is utilized, the depositing of dough cuts can be controlled by the operator of the system, who can arrange to conveniently deposit the dough cuts, in successive rows, on conveyor belt 22 in synchronism with the operation of fryer 44 and aligned with pockets 50a of fryer belt 50.

During the Manual mode of operation, take-away conveyor belt 38 may be operated by an independent drive mechanism (not shown) which is subject to the control of an attendant. This permits the speed of belt 38 to be varied independent of the speed of belt 22 (which is moving at its lower "loading" speed) in order to avoid the build-up of cumulative phase differences between aligned rows of dough pieces on belt 38 and the location of pockets 50a of fryer belt 50. Without such control over belt 38, dough pieces might be deposited on top of the spacer bars which define pockets 50a, rather than properly falling between the bars and into the pockets. The independent control may be achieved by disconnecting drive chain 66 from drive sprocket wheel 40, so that wheel 40 may be driven from a separate variable speed motor (not shown) which can be periodically adjusted by an attendant to maintain the necessary synchronization of dough piece transfer.

The Manual mode of operation is terminated at the discretion of the operator when there are no further dough pieces to be deposited from either the automatic cutter unit 28 or the makeup conveyor system, and all dough pieces have been transferred into fryer 44. At that time, system power can be removed. Accordingly, both of conveyor belts 22 and 38 are halted and the system awaits further activation by the restoration of system power and the utilization of either the Automatic or Manual modes.

It is to be understood that the above-described arrangements are illustrative of the application of the principles of the invention. Numerous other arrangements may be devised by those skilled in the art without departing from the spirit and scope of the invention.

What is claimed is:

1. A system for controlling the transfer of products between sequential processing equipment comprising an in-line processor, a processing chamber, movable transport means for conveying said products through said processing chamber, means for introducing said products onto said transport means at an input end of said chamber, means for discharging said products from said transport means to said in-line processor at an output end of said chamber, means for driving said movable transport means and said discharging means and control means for regulating the operation of said transport means to synchronize said introducing means with said discharging means in accordance with the transfer of said products to said in-line processor, said control means including means for establishing a loading cycle for said sequential processing equipment to periodically operate said introducing means in response to the operation of said in-line processor and to cause said driving means to continuously operate said transport means and said discharging means, said control means further including means for establishing a production cycle to periodically operate said introducing means and to stop said driving means in response to the movement of said products to a detecting station on said discharging means and to cause said driving means to operate said transport means and said discharging means in response to the operation of said in-line processor.

2. A system as defined by claim 1 wherein said introducing means includes means for containing unprocessed material for said products and for automatically depositing said material on said transport means in substantially the shape of said products in response to said control means.

3. A system as defined by claim 1 wherein said introducing means comprises an automatic pressure-responsive extruding machine.

4. A system as defined by claim 1 wherein said movable transport means includes a first conveyor belt, said discharging means includes a second conveyor belt and said control means further includes detection means responsive to the movement of at least a first group of said products to said detecting station to terminate said loading cycle and to commence said production cycle.

5. A system as defined by claim 4 wherein said detecting means includes means for establishing a light beam across the travel path of said products on said second conveyor belt at said predetermined point, and means responsive to the periodic interruption of said beam to halt said conveyor belts and to activate said introducing means during said production cycle.

6. A system as defined by claim 4 wherein said control means includes means for advancing said conveyor belts at a first relatively slower speed during said loading cycle and for alternately halting said conveyor belts and advancing said conveyor belts at a second relatively higher speed during said production cycle.

7. A system as defined by claim 6 wherein said control means further includes auxiliary switching means responsive to the operation of said in-line processor for controlling the advance of said belts during said loading and said production cycles and for controlling the operation of said introducing means only during said loading cycle.

8. A system as defined by claim 7 wherein said in-line processor includes an independently driven conveyor belt, and said auxiliary switching means includes a cam wheel rotatable in response to the movement of said independently driven conveyor belt and a switch adapted to be closed by contact with a portion of said rotatable cam wheel.

9. A system as defined by claim 4 having an automatic mode of operation and including in addition a drive mechanism for said conveyor belts, wherein said control means further includes auxiliary switching means responsive to the operation of said in-line processor for periodically closing a control circuit, first switching means responsive to the closure of said control circuit for governing the advance of said conveyor belts during said loading and production cycles and for governing the activation of said introducing means only during said loading cycle, second switching means responsive to the operation of said first switching means during said loading cycle for continuously enabling said drive mechanism and responsive to the respective operation of said first switching means and of said detecting means during said production cycle for alternately enabling and disabling said drive mechanism, third switching means responsive to the operation of said detecting means for governing the activation of said introducing means only during said production cycle, fourth switching means responsive to the operation of said third switching means for initially inhibiting the activation of said introducing means at the commencement of said production cycle, fifth switching means responsive to the operation of said third switching means for transferring the movement of said belts from a first relatively slower speed during said loading cycle to a second relatively higher speed during said production cycle, and sixth switching means responsive to the operation of said first switching means during said loading cycle and to the operation of said detecting means during said production cycle for controlling the operation of said introducing means.

10. A system as defined by claim 9, wherein said fourth switching means includes timing means for delaying the operation of said fourth switching means responsive to said operation of said third switching means until a predetermined time subsequent to the commencement of said production cycle.

11. A system as defined by claim 9 wherein said third switching means includes timing means for maintaining said third switching means in its operated condition until a predetermined time subsequent to the final operation of said detecting means.

12. A system as defined by claim 1 having a manual mode of operation wherein said movable transport means includes a first conveyor belt and said discharging means includes a second conveyor belt, and wherein said control means includes means operative to establish a continuous operating cycle for at least said first conveyor belt to advance said conveyor belt through said processing chamber at a predetermined relatively low speed.

13. A system as defined by claim 12 including in addition a first drive mechanism for said first conveyor belt, and wherein said control means includes auxiliary switching means responsive to the operation of said in-line processor for closing a control circuit, first swithcing means responsive to the closure of said control circuit for governing the activation of said introducing means, second switching means operative in response to the selection of said manual mode for continuously enabling said first drive mechanism, third switching means responsive to the selection of said manual mode for maintaining the advance of said first conveyor belt at said predetermined relatively slow speed, and fourth switching means responsive to the operation of said first switching means for controlling the operation of said introducing means.

14. A system as defined by claim 13 including in addition a second drive mechanism for said second conveyor belt, and means in said second drive mechanism for periodically adjusting the speed of said second conveyor belt to synchronously transfer said products, received by said second conveyor belt from said first conveyor belt, to said in-line processor.

* * * * *